United States Patent [19]

Coblentz et al.

[11] Patent Number: 4,520,666

[45] Date of Patent: Jun. 4, 1985

[54] METHODS AND APPARATUS FOR DETERMINING FLOW CHARACTERISTICS OF A FLUID IN A WELL FROM TEMPERATURE MEASUREMENTS

[75] Inventors: Andrea Coblentz, Paris; Didier Lefevre, Elancourt, both of France; Pascal Colombani, Littleton, Colo.; Denis Meunier, Paris, France

[73] Assignee: Schlumberger Technology Corp., Houston, Tex.

[21] Appl. No.: 560,354

[22] Filed: Dec. 12, 1983

[30] Foreign Application Priority Data

Dec. 30, 1982 [FR] France ................................ 82 22100

[51] Int. Cl.$^3$ .............................................. E21B 47/06
[52] U.S. Cl. ........................................ 73/155; 73/154
[58] Field of Search ..................... 73/155, 154, 204; 364/422

[56] References Cited

U.S. PATENT DOCUMENTS 3,113,455 12/1963 Sloan et al. .......................... 73/155
4,423,625 1/1984 Bostic et al. ......................... 73/155

Primary Examiner—Jerry W. Myracle
Attorney, Agent, or Firm—H. N. Garrana

[57] ABSTRACT

The invention relates to method and apparatus for determining the flow rate of fluid in a well over an interval including zones where fluid is exchanged between the well and the formations through which it is bored.

A logging sonde is used to measure the temperature of the fluid along said interval, and the flow rate is measured at least at the ends of the interval. Then for each depth, a flow rate value is determined from the measured temperatures and flow rates, and the set of values obtained in this way are recorded.

14 Claims, 4 Drawing Figures

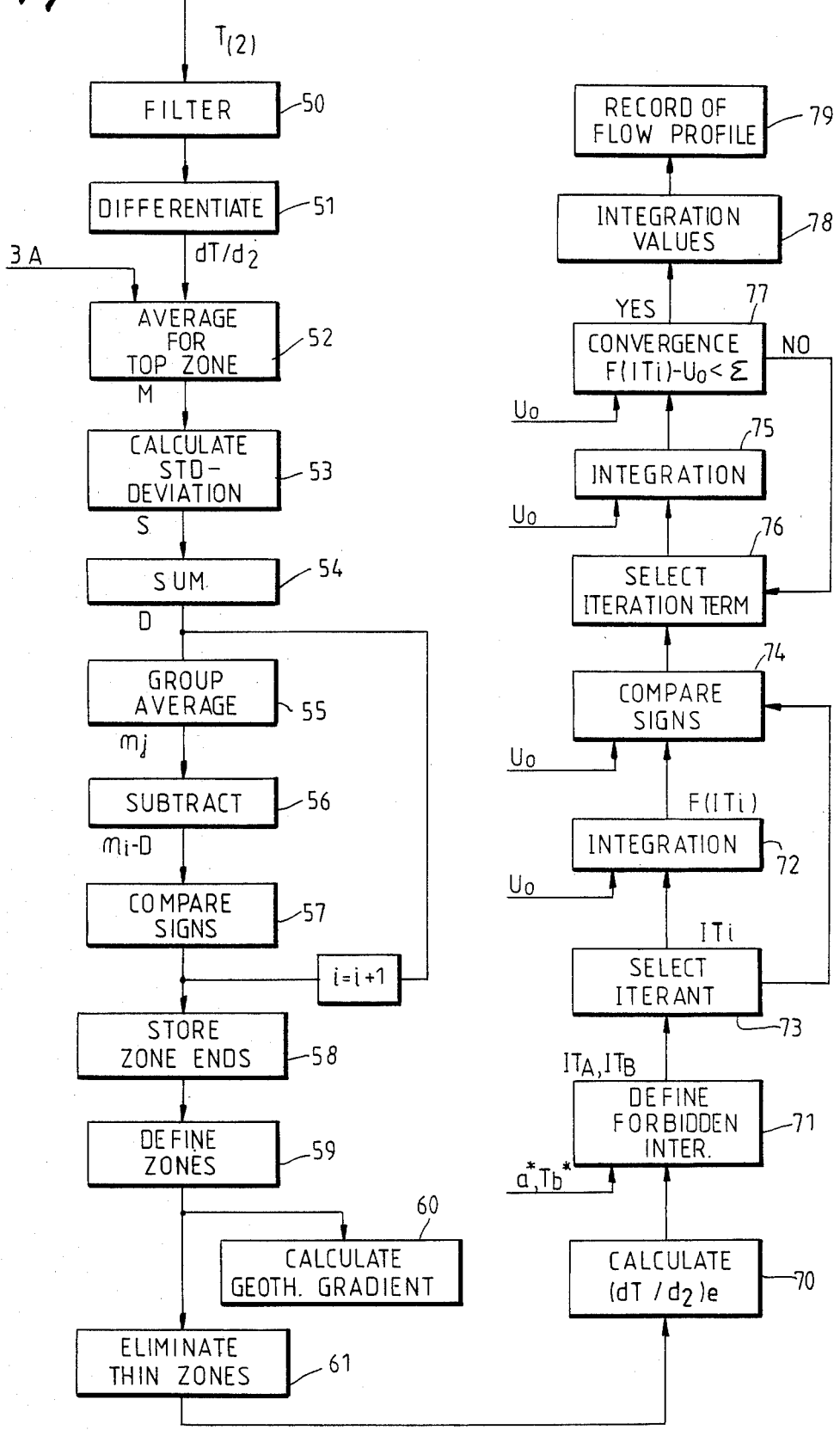

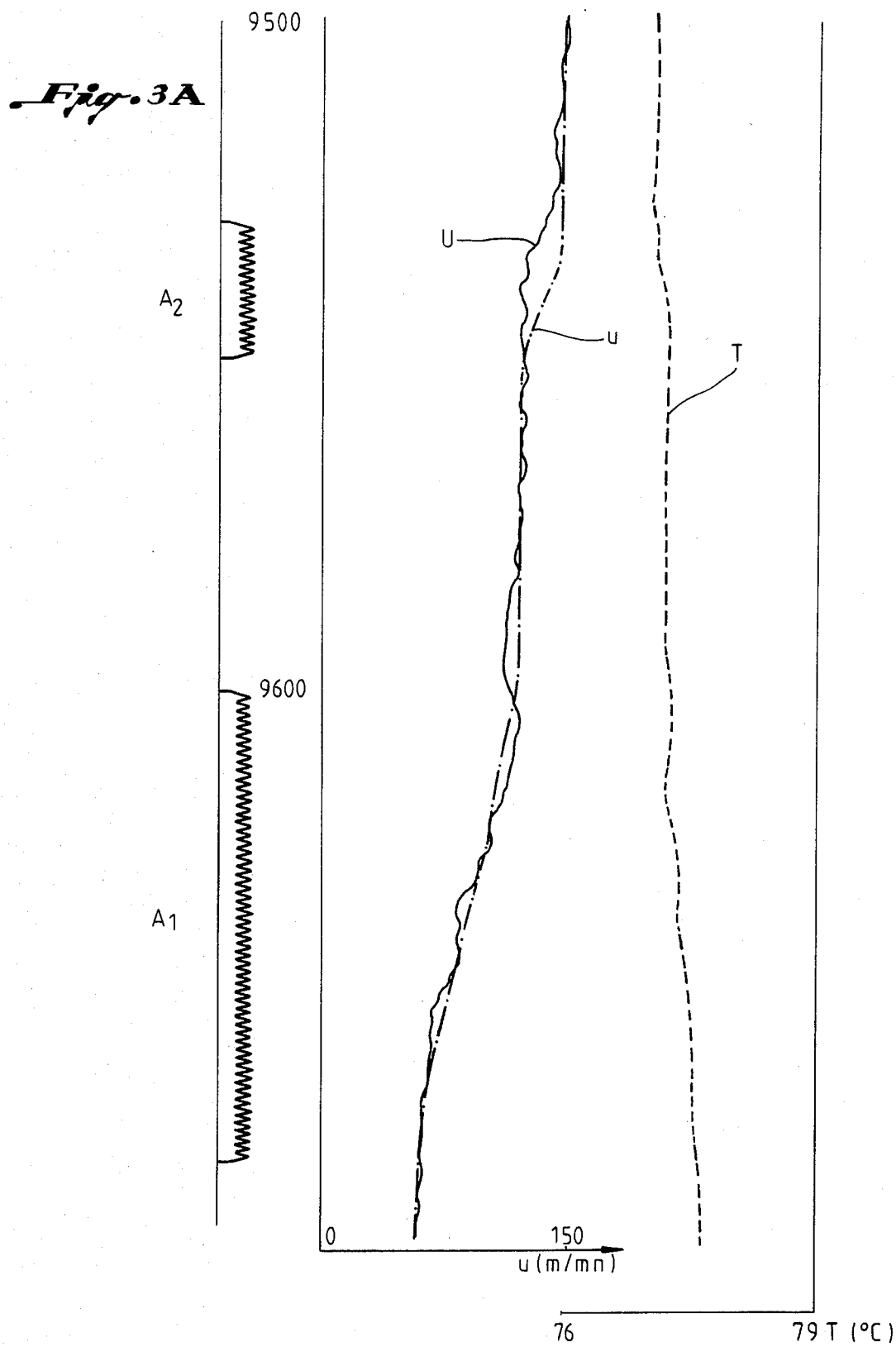

METHODS AND APPARATUS FOR DETERMINING FLOW CHARACTERISTICS OF A FLUID IN A WELL FROM TEMPERATURE MEASUREMENTS

The present invention relates to methods and apparatus for determining the flow characteristics of a fluid in a well, more particularly in zones of the well where fluid is flowing from geological formations into a well passing therethrough, such as the productive zones in a hydrocarbon producing well.

The rate at which fluid flows along a well may be measured by using a flow rate sonde suspended at the end of a cable. By moving the sonde along the well, a flow rate log is obtained giving flow as a function of depth. In the case of a productive well, an examination of the log makes it possible to determine the rate at which fluids are flowing in the well and the rate at which fluids are flowing into the well at its various productive zones, and hence to evaluate the respective yields of the various zones.

The flow rate sondes normally used are spinner devices which only give accurate measurements when the flow is stable. However, fluids entering a well from a formation considerably perturb the flow since the holes made in the well casing to admit fluids are directed radially relative to the well axis. It is generally observed that spinner type flow rate sondes respond to the entry of fluid into the well with a certain delay due to unstable flow conditions.

When there is sufficient separation between consecutive productive zones for the flow to stabilize, spinner type flow rate sondes give accurate measurements, and the flow rates from different productive zones can be correctly evaluated. However, if the productive zones are not far enough apart for the flow to stabilize, the measurements given by a flow rate sonde are inaccurate and do not enable the individual yields of the different productive zones to be evaluated.

Another approach to measuring flow rate relies on the relationship which exists between fluid flow rate and temperature in a well. Consider the case of an oil-producing well. The temperature of the formations, and thus of the liquid in the formations, decreases with decreasing depth following a geothermal gradient. Supposing the liquid in the well to be in thermal equilibrium with the surrounding formations, the temperature in the well will show the same geothermal variation. However, due to the effect of thermal inertia in the fluid entering the well and flowing towards the surface, the temperature in the well above the inlet point is raised to a higher temperature than the temperature corresponding to the geothermal variation.

U.S. Pat. No. 3,913,398 (Curtis) uses a model in which the temperature curve above a production zone exponentially approaches an asymptote parallel to the thermal geothermal. The relaxation distance used in the expotential is a parameter which depends on the density, the specific heat and the mass flow rate of the fluid, together with the time it spends in the well. By examining the temperature profile, intervals having an expotential appearance can be identified. The relaxation distance is matched by iteration until the temperature profile determined on the basis of the model corresponds to the measured profile. The value obtained for the relaxation distance is then used to calculate the mass flow rate and, given the density of the fluid, the volume flow rate.

This technique is of interest in combination with flow rate measurements, in particular for detecting fluid flows outside the well casing. A flow rate sonde is only sensitive to flow along a well, while temperature measurements are influenced by all types of flow whether taking place inside the well or outside it.

However, this technique is based on suppositions that are often quite far removed from real conditions. In particular, it supposes that there is adequate separation between productive zones, i.e., at least thirty meters, and that over an interval starting from a fluid inlet point, the geothermal gradient and heat transfer properties are constant. Unfortunately, the geothermal gradient remains constant only over short intervals corresponding to uniform formations, and the heat transfer characteristics may also vary depending on the state of the well (casing diameter, quality of the cementing between the casing and the formation).

It frequently happens in practice that several narrow productive zones succeed one another at very short intervals, e.g. a few meters. In such cases, the technique of the abovementioned patent will provide the total flow from all the productive zones combined, but will not enable the contribution of each zone to be evaluated individually.

In accordance with the present invention a logging sonde is used to measure the temperature along a depth interval which includes zones where fluid flows between the well and the formations, the flow rate is measured at the ends of the interval, and a flow rate is determined for each depth on the basis of said measured temperatures and flow rates, the set of values thus obtained being recorded as a flow rate profile.

The invention relies on a relationship between the temperature T at a depth z and the flow rate at the same depth. This relationship is deduced by analyzing heat transfers over a short interval dz, and consists in a first order differential equation relating flow rate and its derivative to magnitudes which can be deduced from the temperature profile, namely temperature and its derivative, and the temperature $T_e$ of the fluid in the formation, which temperature $T_e$ varies according to the geothermal gradient.

The differential equation is solved in appropriate manner by iterating the temperature $T_e$ in view of the measured flow rate values at the top and at the bottom of the depth interval under consideration. A flow rate value is thus obtained for each depth in the said interval. The convergence value of the temperature $T_e$ also makes it possible to deduce the geothermal gradient by way of bonus information.

The resulting synthetic flow rate profile makes it possible to accurately analyze the contributions of the different productive zones in a production well. It thus remedies the inadequacies of flow rate sondes in perturbed zones.

A simple method of measuring flow rate is to combine a flow rate sonde and a temperature sonde.

The invention will be better understood by reading the following description, given with reference to the accompanying drawings.

In the drawings:

FIG. 2 is a flow chart showing the processing for obtaining a synthetic flow rate profile from measurements supplied by the apparatus shown in FIG. 1;

FIGS. 3a and 3b are examples of such synthetic flow rate profiles compared with measured flow rates.

Figure 1:
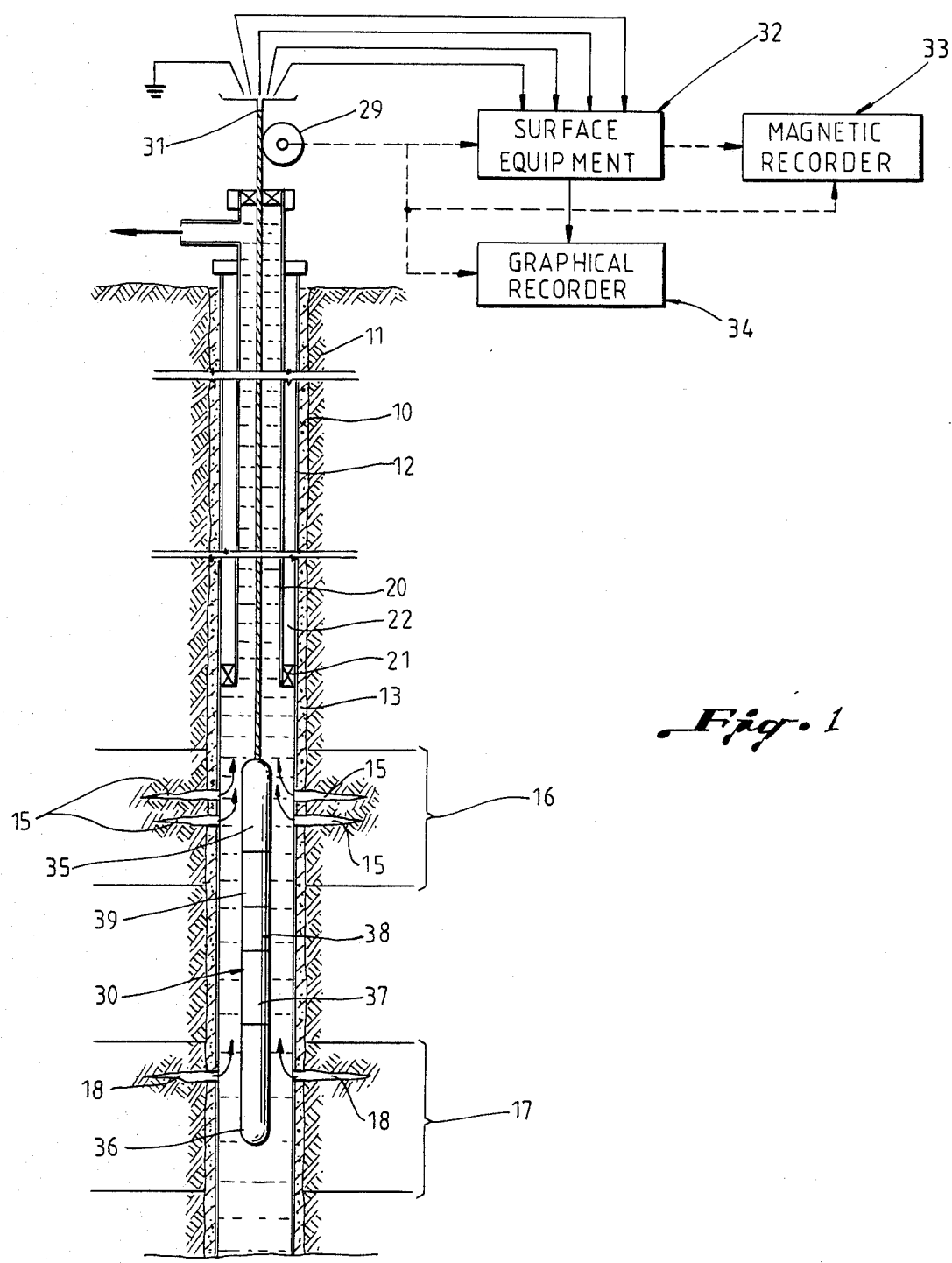
FIG. 1 is a diagram showing a logging apparatus in an oil-producing well.

FIG. 1 shows a borehole 10 passing through formations 11 and fitted with casing 12. The space between the casing and the walls of the borehole is filled with cement 13. A series of perforations such as 15 have been made in a productive zone 16 to enable the fluid present in said zone to flow into the well. Likewise a second productive zone 17 is shown with a corresponding series of perforations 18.

A production column is placed inside the casing above the productive zones, and a packer 21 closes the space 22 between the production column and the casing to constrain the fluid product to flow along the inside of the production column.

FIG. 1 schematically shows logging apparatus comprising a bottom device 30 suspended on an electric cable 31 and connected by the cable to surface equipment 32. The surface equipment includes a winch (not shown) for winding the cable and for supplying the electrical power and control signals necessary for operating the bottom device. The measurement signals provided by the bottom device are recorded by means of a magnetic tape recoder 33 and a graphical recorder 34 associated with the surface equipment. In conventional manner, signals indicative of the depth of the bottom device are supplied by a cable movement measuring device 29 associated with the winch. These signals enable a depth to be associated with each measurement value provided by the bottom device.

The bottom device comprises a set of sondes placed end to end and sensitive to different characteristics, together with a telemetry unit 35 providing the interface between the sondes and the cable.

A typical set of sondes includes: a flow rate sonde 36 sensitive to the speed of fluid flow, e.g. a spinner type flowmeter such as described in U.S. Pat. No. 3,954,006; a sonde 37 sensitive to fluid density such as the gradiomanometer described in U.S. Pat. No. 3,455,157; a temperature sonde 38; and a device 39 for detecting collars in the casing.

It is known that flow rate sondes give accurate measurements only when the flow is relatively stable. Opposite to the perforations, the flow rate measurements are falsified by the perturbations due to the radial admission of fluids into the well. Examples are given in the flow diagrams of FIGS. 3a and 3b. In both of these figures, depth is plotted along the Y-axis and flow rate along the X-axis, with the flow profile as supplied by the flow sonde being plotted as a continuous line.

In all the diagrams, depths are indicated in feet, with graduations at intervals of two feet, or about 63 cm.

FIG. 3a shows two productive zones $A_1$ and $A_2$. The zone $A_1$ extends from the 9670 ft mark to the 9600 ft mark, i.e. over about 22 meters (m). The zone $A_2$ extends from the 9550 ft. mark to the 9590 ft. mark, i.e. over 6.5 m. It can be seen that the flow sonde responds with a marked delay to the admission of fluid through the perforations. In the zone $A_2$ case, it can be seen that the flow increases significantly only near the top of the zone, i.e. above 5 m above the bottom of the zone.

Figure 3B:
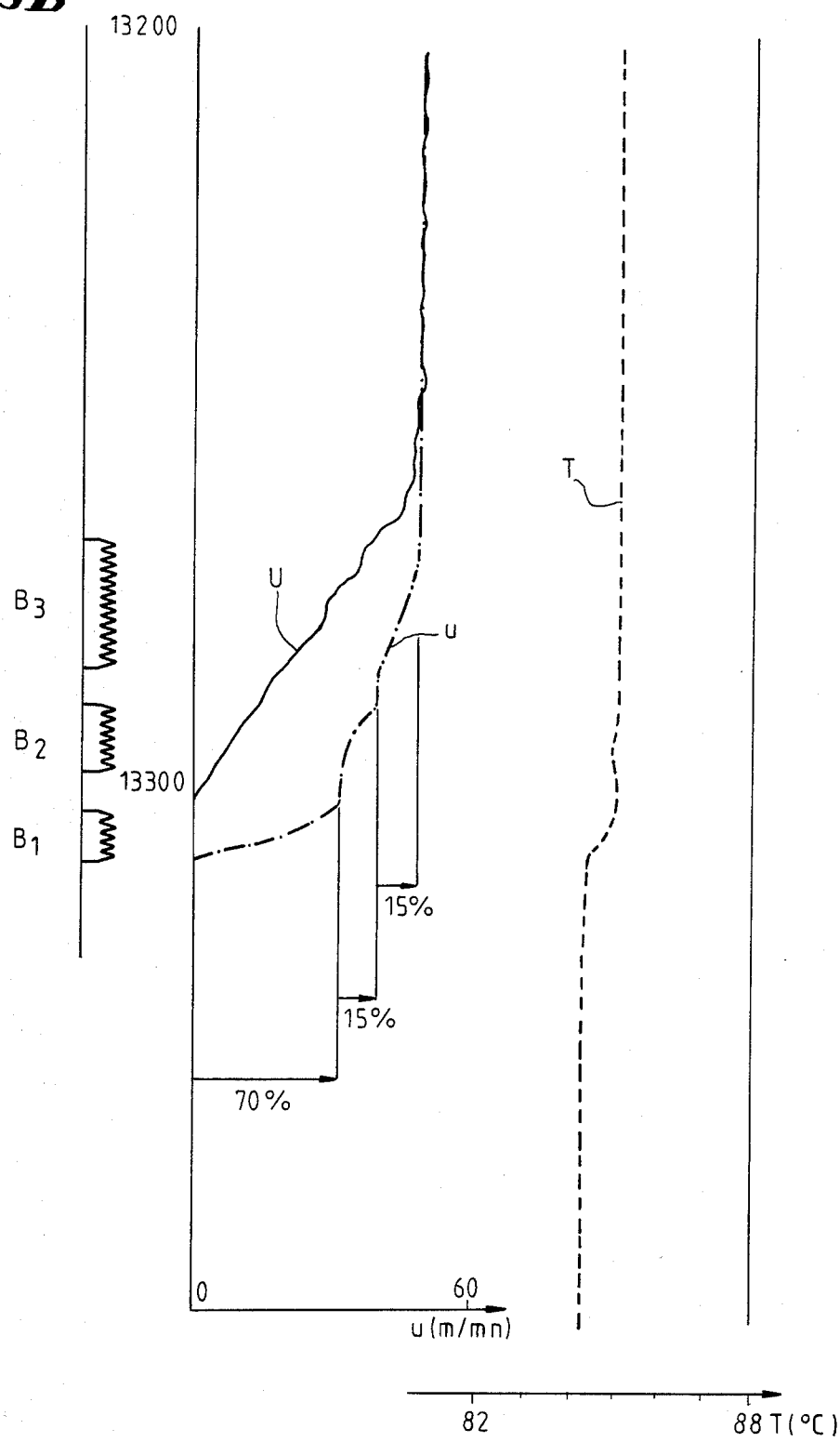

FIG. 3b shows another example having three productive zones $B_1$, $B_2$, and $B_3$ which are separated by very short intervals. Production from the bottom zone $B_1$ is only taken into account once the top of the zone has been passed. This delay may be partially attributable to a faulty depth setting of the flow profile. But whatever the reason, the flow profile in FIG. 3b is incapable of determining the individual contributions from each of the zones $B_1$, $B_2$, and $B_3$.

The above-mentioned relationship between flow rate and temperature in the fluid flowing along a well is taken advantage of in a manner explained below to produce a synthetic flow profile which gives a more accurate and delay-free indication of the exchanges of fluid between the well and the formations.

Consider a volume of well where fluid exchange takes place between the well and the formation.

Let the depth be z, the temperature of the flowing fluid be T, the temperature of the fluid in the formation be $T_e$, the temperature of the fluid entering the well be $T_f$, the temperature at the interface between the formation and the cement surrounding the case be $T_h$, and the flow rate be u.

The principle of conservation of energy leads to the 18 relationship:

$$\frac{dT}{dz} = \frac{4U}{D\rho c_p} \cdot \frac{T - T_h}{u} + (dT/dz)_f - (T - T_f)\frac{1}{u}\frac{du}{dz} \quad (1)$$

Where:
U is the coefficient of heat transfer between the well and the formation;
D is the inside diameter of the casing;
$\rho$ is the density of the fluid; and
$c_p$ is the thermal capacity of the fluid.
The term:

$$\frac{4U}{D\rho c_p} \cdot \frac{T - T_h}{u}$$

corresponds to the exchange of heat between the flowing fluid and the formation due to the difference between the fluid temperature T and the temperature $T_h$.
The term:

$$(dT/dz)_f$$

depends on the fluid phase, expressed in full it becomes:

$$(dT/dz)_f = T(\partial(1/\rho)/\partial T)_p \cdot \frac{dP}{dz} + \frac{dF}{dz} \quad (2)$$

The first term is due to the effects of fluid expansion. It is negligible for a liquid, and may be deduced from the equation of state for a gas.

The second term dF/dz represents the heat due to friction between the fluid and the walls of the casing. This term is equal to:

$$\frac{dF}{dz} = \frac{1}{2} \cdot \frac{fu^2}{D} \quad (3)$$

where f is the coefficient of friction and D is the inside diameter of the casing.
The third term:

$$-(T - T_f)\frac{1}{u}\frac{du}{dz}$$

expresses the variation in temperature due to the exchange of fluid between the formation and the well. This term is zero in stationary zones where no fluid exchange is taking place since du/dz is then zero.

When the fluid product is a liquid, the inlet temperature $T_f$ may be replaced by the formation temperature $T_e$.

When the fluid is a gas, the temperatures $T_e$ and $T_f$ are generally different since the gas expands on entering the well because there is a difference $\Delta P$ between the pressure in the formation and the pressure in the well, and the expansion causes the temperature to change by virtue of the Joule-Thomson effect. We thus have:

$$T_f - T_e = -\eta \Delta P \qquad (4)$$

The Joule-Thomson coefficient $\eta$ is generally positive, in which case the gas cools down on entering the well.

The solution of the differential equation (1) in order to determine the value of the flow rate u at each depth on the basis of the temperature T requires a knowledge of a large number of parameters, many of which are difficult to evaluate with sufficient accuracy.

Thus the heat transfer coefficient U expresses the resistance to the transfer of heat presented by the fluid in the well, the casing and the layer of cement. It is thus itself a function of numerous parameters (thermal conductivities and thicknesses of the various layers).

The temperature $T_h$ at the cement-formation interfaced differs from the temperature $T_e$ of the fluid in the formation. It takes a long time for thermal equilibrium to be established after a well has been put into production. Consequently the temperature difference $T_h - T_e$ between the well fluid and the formation depends on the time for which the well has been producing, and also on the diffusion coefficient and the conductivity of the formation, neither of which is well known.

Another difficulty lies in the determination of the equation of state when the fluid is a gas or a gas-liquid mixture. Really representative equations for hydrocarbons are empirical and require a knowledge of the mixture's composition to be known.

One approach for eliminating all these difficult-to-estimate parameters consists in taking the first two terms of equation (1) together as being that part $(dT/ds)_s$ of the overall temperature gradient which is not due to fluid exchange. In a stationary zone, as shown above, the third term in equation (1) is zero ($du/dz=0$); the sum of the first two terms is thus equal to the temperature gradient in a stationary zone. This quantity may be easily deduced from the measured temperature profile once a zone has been identified in which the temperature gradient is constant over a sufficient depth interval.

For liquid production ($T_f = T_e$), equation (1) thus becomes:

$$\frac{du}{dz} = -u \frac{(dT/dz) - (dT/dz)_s}{T - T_e} \qquad (5)$$

Using this approach, the only magnitude which can not be directly deduced from the temperature profile is the temperature $T_e$ of the fluid in the formation.

The temperature $T_e$ follows the geothermal gradient, but even supposing that this gradient is constant over the depth interval under consideration, its value is poorly known. The technique used for dealing with this difficulty consists in integrating equation (5) by iteration, with $T_e$ being the magnitude under iteration, and by setting conditions at the ends of the interval equal to the measured flow rate values supplied by the flow rate sonde at those depths.

In summary, the process leading to a synthetic flow rate profile requires a knowledge of the flow rate values at the ends of the depth interval under consideration, in addition to the temperature profile.

This process as performed on a programmed digital computer comprises the following steps outlined in FIG. 2.

The measured and recorded temperature profile is composed of a series of discrete values, with a measuring point ever 15 centimeters (cm).

The process begins with the temperature profile being filtered (block 50) to eliminate small variations due to noise. The filtering may consist in appropriate manner of convoluting the temperature profile each time over a given window, e.g. over 20 measurement points, using a triangle function.

The next step (block 51) is to differentiate the filtered temperature profile to obtain dT/dz (the total temperature gradient) for each point.

By analyzing the gradient, stationary zones can be delimited in which the gradient is constant (to within an allowance made for noise) and has a value which is considerably less than opposite the fluid inlets. The fluid inlet zones are defined as non-stationary zones.

This analysis is begun by considering the zone which extends from a depth $z_A$ situated at a certain distance (e.g. 1.5 m) above the highest perforation up to the top of the zone over which temperature is being measured (where the top of the zone is at depth $z_h$). Since the depths of the different perforations are known, the $z_A$ mark is easily established.

The average M of the derivative dT/dz is calculated over the zone $z_A$ to $z_h$ (block 52).

The standard deviation s of the derivative dT/dz is then determined (block 53) over the entire measurement interval, i.e. from mark $z_b$ to $z_h$ to obtain an estimate of noise over the entire interval, and $D = M + s$ is calculated (block 54).

The average m of the derivative dt/dz is calculated (block 55) over n consecutive measurement points (e.g., with n=4), and the average m is compared with the value D (block 56). If m is less than D, the corresponding zone is considered to form part of a stationary zone. This comparison is repeated for all groups of n points.

The comparison is performed in order of increasing depth from the top down. For each group of order i, after comparing the group average $m_i$ with D, the sign of the difference $m_i - D$ is compared with the sign of the previous difference $m_{i-1} - D$ for the previous group of order i−1 (block 57).

If the signs are the same, both groups belong to the same zone (stationary or non-stationary). If the signs are different, the two groups belong to different zones, and the group of positive sign is identified as constituting the end of a non-stationary zone. If the group i−1 gives a negative sign and the group i gives a positive sign, said end defines the rising front of a peak in the curve $f(z) = dT/dz$, where such a peak can be attributed to the ingress of fluid. In the opposite case, said end defines the falling front of such a peak. The ends as determined in this manner are stored together with additional "rising front" and "falling front" codes (block 58).

Fluid admission zones are identified by finding rising fronts followed by respective falling fronts (block 59).

When the zone at the bottom of the interval is examined in this manner, a rising front can be found indicating the end of a stationary zone, but there is no corresponding falling front. This means that the zone in question is following the geothermal gradient, which is greater than the gradient in the stationary zones which are situated between the fluid inlet zones or above them. In this case, the average of the derivative dT/dz is calculated over said zone (block 60). The resulting average may be used in later steps of the process as a value for the geothermal gradient.

Once the above operations have been carried out over the entire interval, which is thereby divided into fluid inlet zones and stationary zones (together with an optional geothermal zone at the bottom of the interval), stationary zones which are too thin (block 61) are eliminated, e.g. zones which occupy less than two measuring points (30 cm).

Once the fluid inlet zones and the stationary zones have been identified, the following expression:

$$(dT/dz)_e = (dT/dz)(dT/dz)_s$$

is calculated (block 70). This expression appears in the numerator of equation (5), and which corresponds to that part of the temperature gradient which can be attributed solely to the incoming fluid.

The calculation is begun by examining whether the depth under consideration lies in a stationary zone or in a fluid inlet zone, i.e. by comparing with the zone ends as determined above. If the zone is a stationary zone, $(dT/dz)_e$ is theoretically close to zero. Its value is calculated by giving $(dt/dz)_s$ the value of the measured gradient $(dT/dz)$ as averaged over the stationary zone under consideration.

In fluid inlet zones, it is preferable to take the average values of $(dT/dz)$ in the stationary zones on either side of the fluid inlet zone under consideration and to give $(dT/dz)_s$ a value equal to a linear interpolation between said average values.

Once the term $(dT/dz)_e$ has been calculated over the entire interval, the differential equation (5) remains to be integrated.

As explained above, the manner in which the temperature $T_e$ in equation (5) varies with depth is poorly known, and the differential equation (5) is integrated in an iterative manner, with $T_e$ being the iterated magnitude. The integration (block 72) provides a set of flow rate values $u(z)$ for each depth z for which there is a temperature measurement.

The set of values which is retained is the set for which the value of the flow rate $u_h$ at the top of the depth interval under consideration is equal to the value $U_0$ measured by the flow sonde at that depth (or at least which differs from $U_0$ by less than a determined amount).

The temperature $T_e$ may be expressed by:

$$T_e = T_b - az$$

where $T_b$ is the temperature of the fluid in the formation at the bottom of the interval under consideration and a is the geothermal gradient over said interval.

The iteration may be effected either on the temperature $T_b$, or else on the geothermal gradient a.

The temperature $T_b^*$ at the top of the geothermal zone as identified in the analysis explained above is used as an estimate of the temperature $T_b$. If the analysis has not enabled a geothermal zone to be detected, the temperature at the bottom of the interval is taken by default.

For the geothermal gradient, an estimated value as deduced from the above analysis is taken, or else an initially given value based on available geological data is taken by default.

When the temperature $T_b$ is being iterated, the gradient is fixed as a* and $T_e$ is written as follows:

$$T_e{}_b^* + DT_b - a^* \cdot z$$

where $DT_b$ is the iterating term.

When the gradient a is being iterated, $T_e$ is written as follows:

$$T_e = T_b^* - (a^* + Da)z$$

where Da is the iterating term.

The mode of iteration must be fixed from the start.

Denoting the iterating term as IT, regardless of whether it applies to the temperature or the gradient, the iterative process consists in arriving at a value $IT_f$ such that $F(IT_f) = U_0$, where F is the result of integrating equation (5) at the top of the depth interval under consideration.

The iteration begins by observing that the value $u_b$ at the bottom of the interval must not be zero since the above-described model does not allow for zero flow rate. If, as is usually the case, the bottom of the interval is deeper than the deepest production zone, or corresponds to the very beginning of said zone, the value measured by the sonde will be zero. In such a case, a very small value is chosen for $u_b$, e.g., 1% of the value U as measured at the top of the interval.

A step prior to the iteration process (block 71) consists in determining intervals of allowable values for IT. Since $T_e$ is present in the denominator of equation (5), any values of IT which would lead to division by zero must be excluded. For the given values of the parameters Tb and a, these forbidden values depend on the values taken by the measured temperature T. These values form a set of discrete values which may be treated as though they constitute a continuous interval. The forbidden interval for IT (ITa, ITb) is deduced therefrom and hence its complements, namely two intervals of allowable values $I_1(-\infty, ITa)$ and $I_2(ITb, +\infty)$.

The iterative process per se can then be performed. It is known that the equation:

$$F(IT) - U_0 = 0$$

has a unique solution $IT_f$, which may lie on either side of the forbidden interval.

The iterative process thus takes place in two stages, a first stage in which the interval containing the solution is identified, and a second stage in which a convergence on the solution is established.

The first stage comes to an end once a first change of sign has been detected in the function:

$$F(IT) - U_0$$

relative to a reference sign. The reference sign corresponds to the value of the iterating term $IT_0$ which is situated in one of the allowable intervals and which is very far the limit. For example take $IT_0=ITa+|KITa-ITb|$ where K is very large.

Successive values of the iterating term are then defined as follows (block 73). An iteration is performed using a value $IT_1$ which is situated in the other interval $I_2$ and likewise situated far from the limit ITb. The process is continued by changing interval each time and taking values $IT_2$, etc., getting closer to the limits ITa and ITb, for example $IT_2=ITa+K/n|ITa-ITb|$, with $n=10$. At each iteration the sign of the value $F(IT_i)-U_0$ is compared with the reference sign (block 74). The first iterating term which gives a change in sign belongs to the interval in which the solution is to be found.

The integration is performed in the same manner during the second stage (block 75) but the iterating term (block 76) is defined using any conventional method applicable to a function which is convex over an interval. The iteration is continued until convergence, i.e. until the difference $F(IT)-U_0$ becomes less than a predetermined small value, (comparison block 77).

The set of flow rate values $u(z)$ corresponding to the convergence is recorded (block 78) in order to obtain a synthetic flow rate profile (block 79).

In FIG. 3a the temperature profile is shown as a dashed line, and the synthetic flow rate profile resulting from the above-described processing is shown as a dot-dashed line. It can be seen that the synthetic profile gives a noticeably more accurate image of the fluid inlets than does the measured profile. In particular, the inlets in the upper zone $A_2$ are taken into consideration without delay.

The FIG. 3b example is even more clear. The synthetic profile makes it possible to evaluate the individual contributions of the three zones $B_1$, $B_2$, and $B_3$ as being 75%, 15% and 15% respectively. Such an evaluation is not possible from the measured profile.

It should be observed that the method described above is capable of providing a value of the geothermal gradient if the iteration is performed on the gradient. In this case, the estimated value $a^*$ should be modified by the value $\Delta a$ corresponding to the convergence.

A variant of the above-described method consists in dividing the total measurement interval into several zones for performing the iterative process. The sonde measured rates at the top and the bottom of each zone are then forced as end conditions.

The process begins with the deepest zone and continues upwardly through zones of decreasing depth. For the deepest zone $Z_1$, the process is identical to the process described above, except that the forced end condition is the flow rate value U measured at the top of the zone.

For the following zone $Z_2$, account must be taken of the fact that the temperature measured at the bottom of the zone is no longer a suitable estimate for the temperature $T_e$ of the fluid in the formation. The value of $T_e$ at the top of zone $Z_1$ is therefore taken as the estimated value of $T_b^*$ where the value is calculated using the final value $IT_f$ of the iterating term.

The same process is applied successively for each of the following zones.

In a gas-producing well, a Joule-Thomson effect correction factor must be applied. The Joule-Thomson coefficient $\eta$ and the pressure difference $\Delta P$ are parameters which may be considered to be constant over the entire measurement interval, and they are not difficult to determine.

This correction must also be applied when gas enters into an oil-producing well. The gas inlet zones are easy to identify from the density profile obtained by the gradiomanometer. This is because the arrival of gas in a well causes a steep drop in density.

We claim:

1. A method for determining the flow rate of fluid in a well over an axial interval which includes zones where fluid is exchanged between the well and the formations, comprising the steps of:
   measuring the temperature along said interval;
   measuring the flow rate at at least two axially separated points of said interval where accurate flow rate measurements can be determined;
   combining said measured temperatures and said measured flow rates, in a manner enabling the determination of a flow rate value for a given point located between said axially separated points from the temperature measurement at said given point.

2. A method according to claim 1, wherein said combining step includes integrating a differential equation over said interval, said equation relating at each point between said axially separated points the flow rate to the temperature of the fluid and to the temperature of the fluid in the formation, the equation being solved by iteration using the temperature as the iterating value, the iteration process relying on a comparison of the value obtained by the integration over the entire interval with the value of the flow rate measured at one of said axially separated points.

3. A method according to claim 2, wherein in said combining step, if the measured flow rate at the bottom of the interval is zero, a small fraction of the flow rate measured at the top of the interval is chosen as the starting value for the integration.

4. A method according to claim 3 characterized by the fact that, for a liquid, the differential equation is in the form:

$$\frac{du}{dz} = u\frac{(dT/dz) - (dT/dz)_s}{T - T_e} \quad (6)$$

where u is the flow rate, z is depth of the interval, T the measured fluid temperature, $T_e$ the temperature of the fluid in the formation and $(dT/dz)_s$ is the temperature gradient due to the transfer of heat between the well and the formation, said gradient being determined from temperature measurements in those zones of said interval in which there is no significant exchange of fluid.

5. A method according to claim 2 characterized by the fact that, for a liquid, the differential equation is in the form:

$$\frac{du}{dz} = -u\frac{(dT/dz) - (dT/dz)_s}{T - T_e} \quad (5)$$

where u is the flow rate, z is depth of the interval, T the measured fluid temperature, $T_e$ the temperature of the fluid in the formation and $(dT/dz)_s$ is the temperature gradient due to the transfer of heat between the well and the formation, said gradient being determined from temperature measurements in those zones of said interval in which there is no significant exchange of fluid.

6. Apparatus for determining the flow rate of fluid in a well over an axial interval which includes zones where fluid is exchanged between the well and the formations, comprising:

means for measuring the temperature along said interval;

means for measuring the flow rate at at least two axially separated points of said interval where accurate flow rate measurements can be determined;

means for combining the output of said temperature measuring means and the output of said flow rates measuring means, in a manner enabling the determination of a flow rate value for a given point located between said axially separated points from the temperature measurement at said given point.

7. Apparatus according to claim 6, wherein said combining means includes means for integrating a differential equation over said interval, said equation relating at each point between said axially separated points the flow rate to the temperature of the fluid and to the temperature of the fluid in the formation, the equation being solved by iteration using the temperature as the iterating value, the iteration process relying on a comparison of the value obtained by the integration over the entire interval with the value of the flow rate measured at one of said axially separated points.

8. Apparatus according to claim 7, wherein in said combining means, if the measured flow rate at the bottom of the interval is zero, a small fraction of the flow rate measured at the top of the interval is chosen as the starting value for the integration.

9. Apparatus according to claim 8 characterized by the fact that, for a liquid, the differential equation is in the form:

$$\frac{du}{dz} - u\frac{(dT/dz) - (dT/dz)_s}{T - T_e} \quad (8)$$

where u is the flow rate, z is depth of the interval, T the measured fluid temperature, $T_e$ the temperature of the fluid in the formation and $(dT/dz)_s$ is the temperature gradient due to the transfer of heat between the well and the formation, said gradient being determined from temperature measurements in those zones of said interval in which there is no significant exchange of fluid.

10. Apparatus according to claim 7 characterized by the fact that, for a liquid, the differential equation is in the form:

$$\frac{du}{dz} - u\frac{(dT/dz) - (dT/dz)_s}{T - T_e} \quad (7)$$

where u is the flow rate, z is depth of the interval, T the measured fluid temperature, $T_e$ the temperature of the fluid in the formation and $(dT/dz)_s$ is the temperature gradient due to the transfer of heat between the well and the formation, said gradient being determined from temperature measurements in those zones of said interval in which there is no significant exchange of fluid.

11. A method for determining the flow rate of fluid in a well over an axial interval which includes zones where fluid is exchanged between the well and the formations, comprising the steps of:

measuring the temperature along said interval;

measuring the flow rate at at least two axially separated points of said interval where accurate flow rate measurements can be determined;

combining said measured temperatures and said measured flow rates, in a manner enabling the determination of a flow rate value for a given point located between said axially separated points from the temperature measurement at said given point, wherein said combining step includes integrating a differential equation over said interval, said equation relating at each point between said axially separated points the flow rate to the temperature of the fluid and to the temperature of the fluid in the formation, the equation being solved by iteration using the temperature as the iterating value, the iteration process relying on a comparison of the value obtained by the integration over the entire interval with the value of the flow rate measured at one of said axially separated points.

12. A method according to claim 11, wherein in said combining step, if the measured flow rate at the bottom of the interval is zero, a small fraction of the flow rate measured at the top of the interval is chosen as the starting value for the integration.

13. A method according to claim 12 characterized by the fact that, for a liquid, the differential equation is in the form:

$$\frac{du}{dz} - u\frac{(dT/dz) - (dT/dz)_s}{T - T_e} \quad (10)$$

where u is the flow rate, z is depth of the interval, T the measured fluid temperature, $T_e$ the temperature of the fluid in the formation and $(dT/dz)_s$ is the temperature gradient due to the transfer of heat between the well and the formation, said gradient being determined from temperature measurements in those zones of said interval in which there is no significant exchange of fluid.

14. A method according to claim 11 characterized by the fact that, for a liquid, the differential equation is written in the form:

$$\frac{du}{dz} - u\frac{(dT/dz) - (dT/dz)_s}{T - T_e} \quad (9)$$

where u is the flow rate, z is depth of the interval, T the measured fluid temperature, $T_e$ the temperature of the fluid in the formation and $(dT/dz)_s$ is the temperature gradient due to the transfer of heat between the well and the formation, said gradient being determined from temperature measurements in those zones of said interval in which there is no significant exchange of fluid.

* * * * *